(12) United States Patent
Morishima

(10) Patent No.: US 9,621,075 B2
(45) Date of Patent: Apr. 11, 2017

(54) INERTIAL DRIVE ACTUATOR

(71) Applicant: OLYMPUS CORPORATION, Tokyo (JP)

(72) Inventor: Tetsuya Morishima, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 268 days.

(21) Appl. No.: 14/528,306

(22) Filed: Oct. 30, 2014

(65) Prior Publication Data

US 2015/0048719 A1 Feb. 19, 2015

Related U.S. Application Data

(63) Continuation of application No. PCT/JP2013/061392, filed on Apr. 17, 2013.

(30) Foreign Application Priority Data

May 1, 2012 (JP) .................................. 2012-104602

(51) Int. Cl.
*H02N 2/02* (2006.01)
*H02N 2/00* (2006.01)

(52) U.S. Cl.
CPC ........... *H02N 2/026* (2013.01); *H02N 2/0055* (2013.01); *H02N 2/025* (2013.01)

(58) Field of Classification Search
CPC ....... H02N 2/026; H02N 2/025; H02N 2/0055
USPC ......................................................... 310/329
See application file for complete search history.

(56) References Cited

U.S. PATENT DOCUMENTS

| 7,498,681 | B1* | 3/2009 | Kellogg | ................. | H02K 35/02 |
|  |  |  |  |  | 290/1 R |
| 7,808,153 | B2 | 10/2010 | Matsuki |  |  |
| 2009/0189486 | A1 | 7/2009 | Matsuki |  |  |
| 2009/0218824 | A1* | 9/2009 | Freeland | ................. | H02K 35/04 |
|  |  |  |  |  | 290/1 R |

(Continued)

FOREIGN PATENT DOCUMENTS

| JP | H11-136979 A | 5/1999 |
| JP | 2009-177974 A | 8/2009 |
| WO | WO 2011/055427 A1 | 5/2011 |

OTHER PUBLICATIONS

International Search Report dated Jul. 30, 2013 issued in PCT/JP2013/061392.

(Continued)

*Primary Examiner* — J. San Martin
(74) *Attorney, Agent, or Firm* — Scully, Scott, Murphy & Presser, P.C.

(57) ABSTRACT

The task of the present invention is to provide an inertial drive actuator having a small-size arrangement, without using a vibration substrate. The inertial drive actuator includes a coil, a movable body which is disposed in a direction in which, a magnetic flux of the coil is generated, and which is formed of a magnetic material having a surface facing the coil, and a displacement generator (piezoelectric element) which displaces the coil in a direction different from the direction in which the magnetic flux is generated. Moreover, the movable body is displaced relatively with respect to the displacement generator (piezoelectric element), along a direction of displacement of the displacement generator (piezoelectric element).

11 Claims, 5 Drawing Sheets

(56) References Cited

U.S. PATENT DOCUMENTS

| | | | |
|---|---|---|---|
| 2012/0268055 A1 | 10/2012 | Takahashi et al. | |
| 2014/0183982 A1* | 7/2014 | Takahashi | H02N 2/025 310/17 |
| 2015/0061463 A1* | 3/2015 | Takahashi | H02N 2/025 310/329 |
| 2015/0229239 A1* | 8/2015 | Takahashi | H02N 2/026 310/323.02 |
| 2016/0233012 A1* | 8/2016 | Lubinski | H01F 7/12 |

OTHER PUBLICATIONS

English translation of International Preliminary Report on Patentability together with the Written Opinion dated Nov. 13, 2014 received in related International Application No. PCT/JP2013/061392.

* cited by examiner

INERTIAL DRIVE ACTUATOR

CROSS-REFERENCE TO RELATED APPLICATION

The present application is a continuation application of PCT/JP2013/061392 filed on Apr. 17, 2013 and claims a benefit of priority from the prior Japanese Patent Application No. 2012-104602 filed on May 1, 2012; the entire contents of which are incorporated herein by reference.

BACKGROUND OF THE INVENTION

Field of the Invention

The present invention relates to an inertial drive actuator.

Description of the Related Art

In a conventional inertial drive actuator, as shown in Japanese Patent Application Laid-open Publication No. 2009-177974 for example, one end of a piezoelectric element is fixed to a fixed member and the other end of the piezoelectric element is fixed to a vibration substrate. A movable body which is capable of moving in a direction of vibration of the piezoelectric element is disposed on the vibration substrate. Here, the fixed substrate or the vibration substrate is made of a magnetic material (such as iron and stainless steel having a magnetic property), and an adsorbing portion is also a magnetic material. When an electric current is applied to a coil, a magnetic field is generated. The magnetic field that is generated also generates a magnetic field in the adsorbing portion. By the magnetic field generated in the adsorbing portion, a magnetic adsorptive force is generated in the vibration substrate or the fixed member which is a magnetic material, and as a result of which, the movable body and the vibration substrate make a close contact, and a frictional force is generated between the movable body and the vibration substrate.

SUMMARY OF THE INVENTION

An inertial drive actuator according to the present invention includes a coil, a movable body which is disposed in a direction in which, a magnetic flux of the coil is generated, and which is formed of a magnetic material having a surface facing the coil, and a displacement generator which displaces the coil in a direction different from the direction in which the magnetic flux is generated, and the movable body is displaced relatively with respect to the displacement generator, along a direction of displacement of the displacement generator.

DETAILED DESCRIPTION OF THE INVENTION

Exemplary embodiments of an inertial drive actuator according to the present invention will be described below in detail by referring to the accompanying diagrams. However, the present invention is not restricted to the embodiments described below.

First Embodiment

Figure 1A:
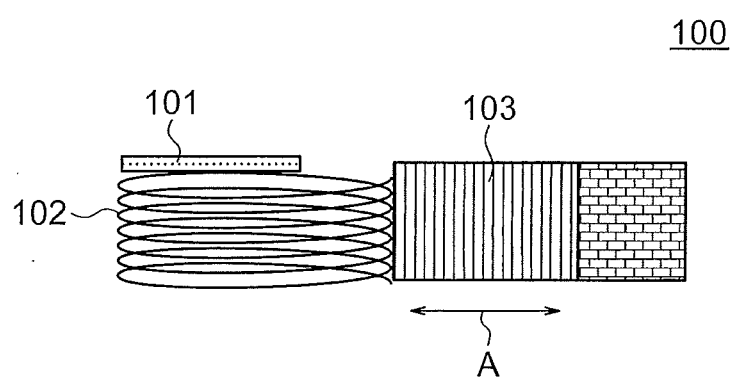
FIG. 1A is a diagram showing a side view of an arrangement of an inertial drive actuator according to a first embodiment of the present invention.

FIG. 1A is a diagram showing an arrangement when an inertial drive actuator according to a first embodiment of the present invention is seen in a side view.

An inertial drive actuator 100 includes a coil 102, a movable body 101 which is disposed in a direction in which a magnetic flux of the coil 102 is generated, and which is formed of a magnetic material having a surface facing the coil 102, and a piezoelectric element (displacement generator) 103 which displaces the coil 102 in a direction different from the direction in which, the magnetic flux is generated.

The movable body 101 is displaced relatively with respect to the piezoelectric element 103, along a direction of displacement of the piezoelectric element 103.

Accordingly, it is possible to realize an inertial drive actuator of a small-size arrangement, without a vibration substrate as has hitherto been used.

Description of an arrangement of the present embodiment will be continued further. The coil 102 is displaced in a direction along an arrow mark A by the piezoelectric element 103. In concert with the timing of displacement, an electric current is applied to the coil 102 and a magnetic flux is generated. Accordingly, the movable body 101 is adsorbed. As a result, a frictional state between the movable body 101 and the coil 102 changes. By using the change in the frictional force and the displacement of the coil 102, the movable body 101 is moved.

In a case of moving the movable body 101 in a leftward direction in the diagram, an electric current is applied to the coil 102 and the piezoelectric element 103, and in a state of a friction between the coil 102 and the movable body 101 increased, the piezoelectric element 103 is elongated. The movable body 101 is displaced in a direction of elongation of the piezoelectric element 103 with the displacement of the coil 102. Next, applying the electric current to the coil 102 and the piezoelectric element 103 is stopped, and the piezoelectric element 103 is made to contract. At this time, a frictional force between the coil 102 and the movable body 101 is reduced. Therefore, the movable body 101 comes to halt at that location due to inertia. By repeating this, the movable body 101 moves in the leftward direction in the diagram.

Whereas, in a case of moving the movable body 101 in a rightward direction in the diagram, without applying the electric current to the coil 102, the electric current is applied to the piezoelectric element 103. In a state of the friction between the coil 102 and the movable body 101 reduced, the piezoelectric element 103 is elongated. The movable body 101 comes to halt at that location due to inertia.

Next, in a state of the electric current applied to the coil 102, applying the electric current to the piezoelectric element 103 is stopped, and the piezoelectric element 103 is made to contract.

At this time, the frictional force between the coil 102 and the movable body 101 has increased. Accordingly, the movable body 101 is displaced in a direction of contraction of the piezoelectric element 103 with the displacement of the coil 102. By repeating this, the movable body 101 moves in the rightward direction in the diagram.

According to the present embodiment, the vibration substrate is unnecessary as aforementioned. Accordingly, it is possible to realize an inertial drive actuator having a small-size arrangement.

Furthermore, wiring for the movable body is unnecessary. For this reason, since it is possible to set a stroke of the movable body irrespective of the wiring, it is advantageous.

Second Embodiment

Next, an inertial drive actuator according to a second embodiment of the present invention will be described below.

Figure 1B:
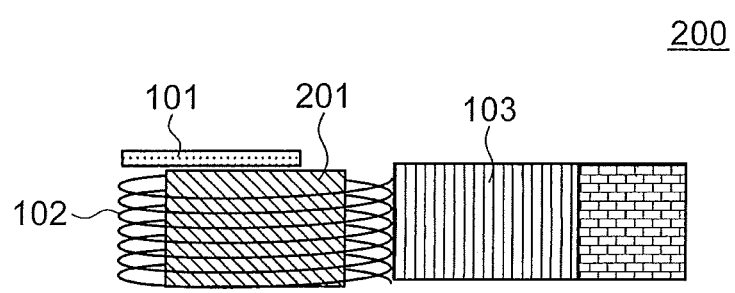
FIG. 1B is a diagram showing a side view of an arrangement of an inertial drive actuator according to a second embodiment of the present invention.

FIG. 1B is a diagram showing an arrangement when an inertial drive actuator 200 according to the present embodiment is seen in a side view. In description of all the examples that follow, same reference numerals are assigned to components which are same as in the first embodiment, and repetitive description is omitted.

In the present embodiment, for increasing a magnetic flux density, a core material 201 which is formed of a magnetic material is disposed at an inner side of the coil 102. The core material 201 may be brought in contact with the movable body 101. In a case of bringing the core material 201 and the movable body 101 in contact, the core material 201, or the core material 201 and the coil 102 are to be displaced.

According to the present embodiment, it is possible to make strong the magnetic flux generated by the coil 102. Moreover, it is possible to release heat of the coil 102 efficiently. Furthermore, rigidity of the coil 102 is improved.

Third Embodiment

Next, an inertial drive actuator according to a third embodiment of the present invention will be described below.

Figure 2A:
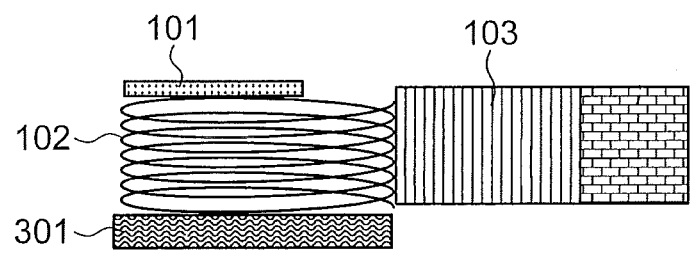
FIG. 2A is a diagram showing a side view of an arrangement of an inertial drive actuator according to a third embodiment of the present invention.

FIG. 2A is a diagram showing an arrangement when an inertial drive actuator 300 according to the present embodiment is seen in a side view.

In the present embodiment, when no electric current is applied to the coil 102, for adsorbing the movable body 101, a permanent magnet 301 is disposed on a side of the coil 102, opposite to the movable 101. By such arrangement, it is possible to increase or decrease the frictional force between the movable body 101 and the coil 102 in a direction in which, the electric current is applied to the coil 102.

For instance, when the electric current is applied to the coil 102 such that a magnetic field is generated in a direction same as of the permanent magnet 301, the frictional force between the movable body 101 and the coil 102 increases. Moreover, when the electric current is applied to the coil 102 such that the electric field is generated in a direction opposite to that of the permanent magnet 301, it is possible to decrease the frictional force. The inertial drive actuator is realized by using any change in the frictional force such as, increasing the frictional force, decreasing the frictional force, and increasing and decreasing the frictional force.

According to the present embodiment, it is possible to hold the movable body 101 when no electric current is applied to the coil 102. Moreover, it is possible to release heat of the coil 102 efficiently. Furthermore, the rigidity of coil 102 is improved.

Fourth Embodiment

Figure 2B:
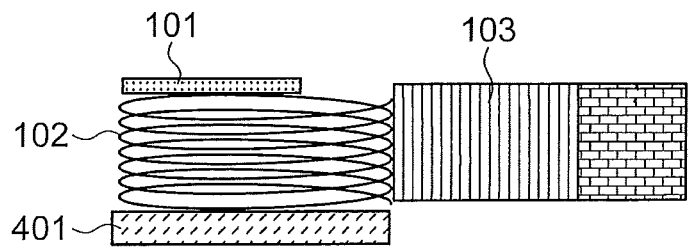
FIG. 2B is a diagram showing a side view of an arrangement of an inertial drive actuator according to a fourth embodiment of the present invention.

Next, an inertial drive actuator according to a fourth embodiment of the present invention will be described below. FIG. 2B is a diagram showing an arrangement when an inertial drive actuator 400 according to the present embodiment is seen in a side view.

In the present embodiment, for using the magnetic flux efficiently, a yoke material 401 is disposed in a direction of the coil 102, different from, or on opposite side of the movable body 101.

According to the present embodiment, it is possible to close the magnetic flux of the coil 102, and to reduce a leakage magnetic flux. Moreover, it is possible to release the heat of the coil 102 efficiently. Furthermore, the rigidity of the coil 102 is improved.

Fifth Embodiment

Figure 3A:
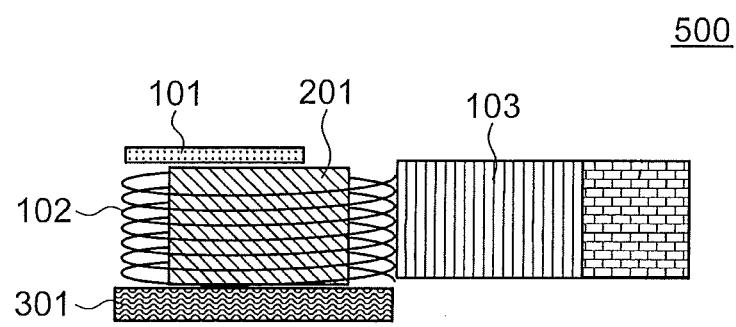
FIG. 3A is a diagram showing a side view of an arrangement of an inertial drive actuator according to a fifth embodiment of the present invention.

Next, an inertial drive actuator according to a fifth embodiment of the present invention will be described below. FIG. 3A is a diagram showing an arrangement when an inertial drive actuator 500 according to the present embodiment is seen in a side view.

In the present embodiment, the core material 201 is disposed to be interposed between the movable body 101 and the coil 102.

Accordingly, by the core material 201 contacting with the movable body 101, it is possible to transmit a displacement of the piezoelectric element 103 to the movable body 101. Moreover, it is possible to protect the coil 102 from the movable body 101. Also, it is possible to protect the coil 102 from the piezoelectric element 103. Furthermore, since a portion in contact of the core material 201 and the movable body 101 becomes large, it is possible to transmit the magnetic flux to the movable body 101 efficiently. Moreover, it is possible to release the heat of the coil 102 efficiently. Furthermore, it is possible to prevent the slipping-drop of the coil 102.

Sixth Embodiment

Next, an inertial drive actuator according to a sixth embodiment of the present invention will be described below.

Figure 3B:
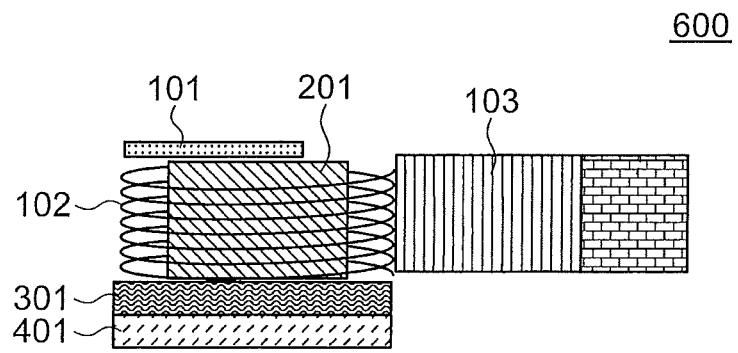
FIG. 3B is a diagram showing a side view of an arrangement of an inertial drive actuator according to a sixth embodiment of the present invention.

FIG. 3B is a diagram showing an arrangement when an inertial drive actuator 600 of the present embodiment is seen in a side view.

In the present embodiment, the coil material 201 is disposed to be interposed between the permanent magnet 301 and the yoke material 401, and the coil 102.

Accordingly, an area of contact with the permanent magnet 301 increases, and, it is possible to receive the magnetic flux of the magnet efficiently. Moreover, since the core material 201 moves on the permanent magnet 301, it is possible to protect the coil 102 from the permanent magnet 301. Furthermore, since the core material 201 moves on the permanent magnet 301, it is possible to protect the coil 102 from the piezoelectric element 103. It is possible to distance the permanent magnet 301 away from the heat of the coil 102. Moreover, it is possible to release the heat of the coil 102 efficiently. Also it is possible to increase an area of contact between the core material 201 and the permanent magnet 301, and to increase adhesion strength.

Seventh Embodiment

Next, an inertial drive actuator according to a seventh embodiment of the present invention will be described below.

Figure 4A:
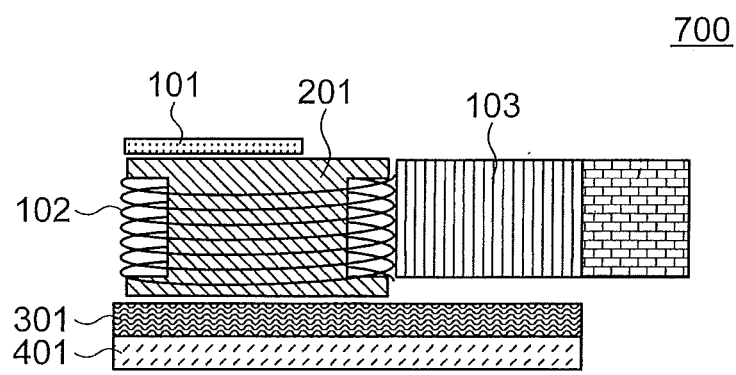
FIG. 4A is a diagram showing a side view of an arrangement of an inertial drive actuator according to a seventh embodiment of the present invention.

FIG. 4A shows a diagram of an arrangement when an inertial drive actuator 700 according to the present embodiment is seen in a side view.

In the present embodiment, it is an arrangement of displacing the core material 201 by the piezoelectric element 103. Accordingly, the core material 201 is capable of carrying out displacement-transmission of the piezoelectric element 103. Moreover, the coil 102 is protected from components such as the movable body 101, the piezoelectric element 103, and the permanent magnet 301. It is also possible to improve the rigidity of the coil 102.

Eighth Embodiment

Next, an inertial drive actuator according to an eighth embodiment of the present invention will be described below.

Figure 4B:
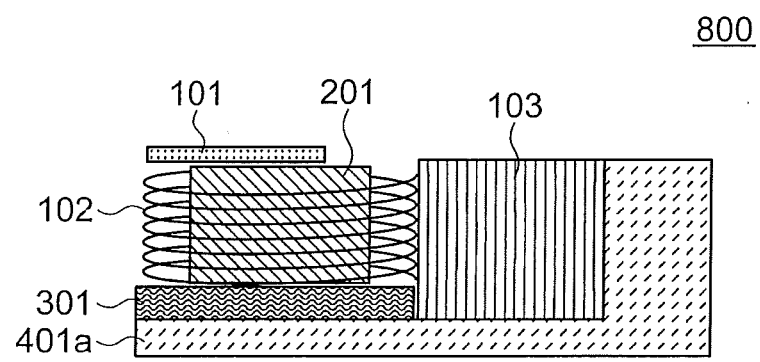
FIG. 4B is a diagram showing a side view of an arrangement of an inertial drive actuator according to an eighth embodiment of the present invention.

FIG. 4B is a diagram showing an arrangement when an inertial drive actuator 800 according to the present embodiment is seen in a side view.

In the present embodiment, the permanent magnet 301 is to be displaced together with the coil 102. At this time, a yoke material 401a may be let to be a fixed member.

It is possible to improve rigidity of the coil 102 and the core material 201. Moreover, it is possible to distance the piezoelectric element 103 from an active layer, and to prevent the heat of the piezoelectric element 103 from being conducted directly to the permanent magnet 301.

It is possible to prevent conduction to the piezoelectric element 103. Here, coating of a small-size magnet is difficult. Therefore, it is more desirable to avoid an arrangement of disposing a magnet on an electrode portion corresponding to the active layer of the piezoelectric element 103 (refer to FIG. 4A). According to the present embodiment, it is possible to avoid such arrangement easily.

Moreover, it is possible to make the coil 102 vibrate by making the permanent magnet 301 vibrate. Accordingly, it is possible to transmit the displacement of the piezoelectric element 103 to the coil 102.

According to the arrangement of the present embodiment, a degree of freedom of mounting improves. Furthermore, a degree of freedom of selecting a material for arrangement improves. Therefore, it is possible to achieve small-sizing while reducing cost.

Ninth Embodiment

Next, an inertial drive actuator according to a ninth embodiment of the present invention will be described below.

Figure 5A:
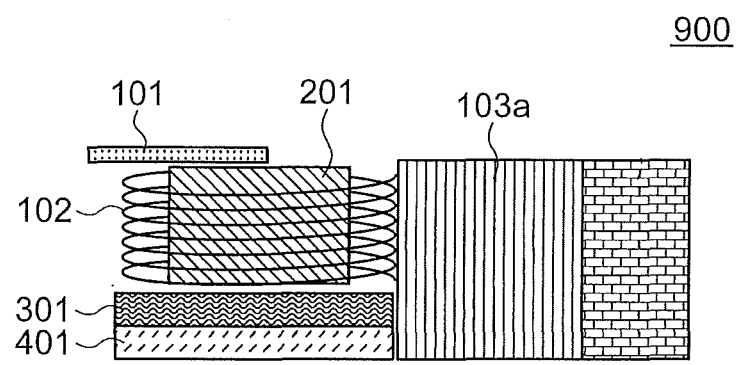
FIG. 5A is a diagram showing a side view of an arrangement of an inertial drive actuator according to a ninth embodiment of the present invention.

FIG. 5A is a diagram showing an arrangement when an inertial drive actuator 900 according to the present embodiment is seen in a side view.

The present embodiment is an arrangement of displacing the yoke material 401 by the piezoelectric element 103.

By this arrangement, it is possible to make the permanent magnet 301 and the yoke material 401 vibrate together. Accordingly, no friction occurs between the permanent magnet 301 and the yoke material 401. Moreover, it is possible to make a size of the piezoelectric element 103 large. Accordingly, it is possible to increase a driving force. Moreover, it is possible to improve the rigidity of the coil 102, the core material 201, and the permanent magnet 301.

Furthermore, by making the permanent magnet 301 and the yoke material 401 contact, it is possible to achieve strength as a frame while carrying out a function of the yoke. Accordingly, the small-sizing is possible. Moreover, it is possible to displace the permanent magnet 301 and the yoke material 401 together with the coil 102.

Tenth Embodiment

Next, an inertial drive actuator according to a tenth embodiment of the present invention will be described below.

Figure 5B:
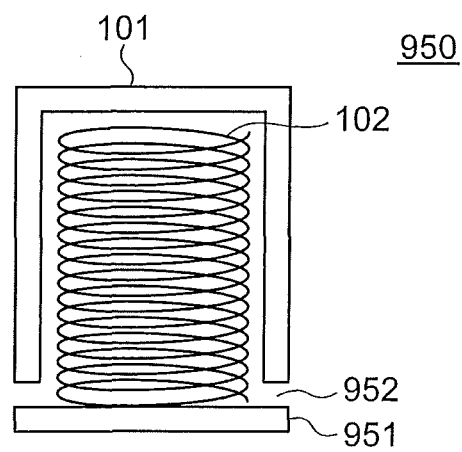
FIG. 5B is a diagram showing a side view of an arrangement of an inertial drive actuator according to a tenth embodiment of the present invention.

FIG. 5B is a diagram showing an arrangement when an inertial drive actuator 950 according to the present embodiment is seen in a side view.

The inertial drive actuator 950 according to the present embodiment includes a non-magnetic layer (an air gap) 952 between the movable body 101 and a yoke material 951. The movable body 101 has a function as a yoke having a shape covering the coil 102.

In the present embodiment, it is possible to close the magnetic flux. Moreover, it is also possible to achieve a guide function at the time of movement of the movable body 101. Furthermore, it is possible to prevent lifting-off from the core material (not shown in the diagram) and inclining due to the movable body 101 making a contact with a fixed portion. Accordingly, the core material and the movable body can be in a stable contact all the time. Moreover, it is possible to reduce friction.

In each of the abovementioned embodiments, it is possible to dispose the permanent magnet 301 to be interposed between the yoke material 401 and the coil 301.

Accordingly, a change in the magnetic flux of the coil 102 is not inhibited. Moreover, it is possible to close the magnetic flux of the magnet by the yoke material.

Moreover, in each of the abovementioned embodiments, it is desirable to adopt the following arrangements.

(A) To make a coating on the movable body 101, for reducing friction and/or reducing wearing, (B) To make a coating on the coil 102, for reducing friction and/or reducing wearing, (C) To make a coating on the core material 201, for reducing friction and/or reducing wearing, (D) To make a coating on the permanent magnet 301, for reducing friction and/or reducing wearing, and (E) To make a coating on the yoke material 401, for reducing friction and/or reducing wearing.

As described heretofore, the present invention is useful for an inertial drive actuator having a small-size arrangement, without using a vibration substrate.

The present invention shows an effect that it is possible to provide an inertial drive actuator having a small-size arrangement, without using a vibration substrate.

What is claimed is:

1. An inertial drive actuator comprising:
   a coil;
   a movable body which is disposed in a direction in which, a magnetic flux of the coil is generated, and which is formed of a magnetic material having a surface facing the coil; and
   a displacement generator which displaces the coil in a direction different from the direction in which the magnetic flux is generated, wherein
   the movable body is displaced relatively with respect to the displacement generator, along a direction of displacement of the displacement generator.

2. The inertial drive actuator according to claim 1, further comprising:
   a core material which is disposed at an inner side of the coil, and which is formed of a magnetic material.

3. The inertial drive actuator according to claim 1, further comprising:
   a permanent magnet which is disposed in a direction of the coil, different from the movable body.

4. The inertial drive actuator according to claim 1, further comprising:
   a yoke material which is disposed in the direction of the coil, different from the movable body.

5. The inertial drive actuator according to claim 2, wherein the core material is interposed between the movable body and the coil.

6. The inertial drive actuator according to claim 3, wherein the core material is interposed between the permanent magnet and the coil.

7. The inertial drive actuator according to claim 2, wherein the core material is displaced by the displacement generator.

8. The inertial drive actuator according to claim 3, wherein the permanent magnet is displaced by the displacement generator.

9. The inertial drive actuator according to claim 4, wherein the yoke material is displaced by the displacement generator.

10. The inertial drive actuator according to claim 4, comprising:
    a non-magnetic layer between the movable body and the yoke material, wherein
    the movable body becomes a yoke.

11. The inertial drive actuator according to claim 4, wherein the permanent magnet is interposed between the yoke material and the coil.

* * * * *